United States Patent [19]
Paskey et al.

[11] Patent Number: 5,310,217
[45] Date of Patent: May 10, 1994

[54] RAM GUARD

[76] Inventors: Robert L. Paskey; Janice M. Paskey, both of 2561 Loganberry Cir., Seabrook, Tex. 77586; Curtis W. Paskey, 2011 Vince, Pasadena, Tex. 77502; William D. Paskey, 1417 Harris, Pasadena, Tex. 77506

[21] Appl. No.: 983,049

[22] Filed: Nov. 30, 1992

[51] Int. Cl.$^5$ .............................................. B60R 19/00
[52] U.S. Cl. .................. 280/763.1; 280/770; 212/189
[58] Field of Search ............................ 280/763.1, 770; 212/189

[56] References Cited

U.S. PATENT DOCUMENTS 3,976,306  8/1976  Nault ................................. 280/763.1
4,397,479  8/1983  Schmidt ............................. 212/189

Primary Examiner—Richard M. Camby
Attorney, Agent, or Firm—Kurt S. Myers

[57] ABSTRACT

The present invention is directed to a ram guard, which is attached to a stabilizer arm having an exposed hydraulic ram, having an outside surface which has a linear length greater than the length of the rod when fully extended. More specifically, the ram guard of the present invention comprises an outside surface attached to a stabilizer arm which has a linear length greater than the length of the piston rod of the ram, an upper surface to cover the exposed piston rod, and an end surface which attaches to the piece of the stabilizer arm to which the piston rod is attached.

2 Claims, 2 Drawing Sheets

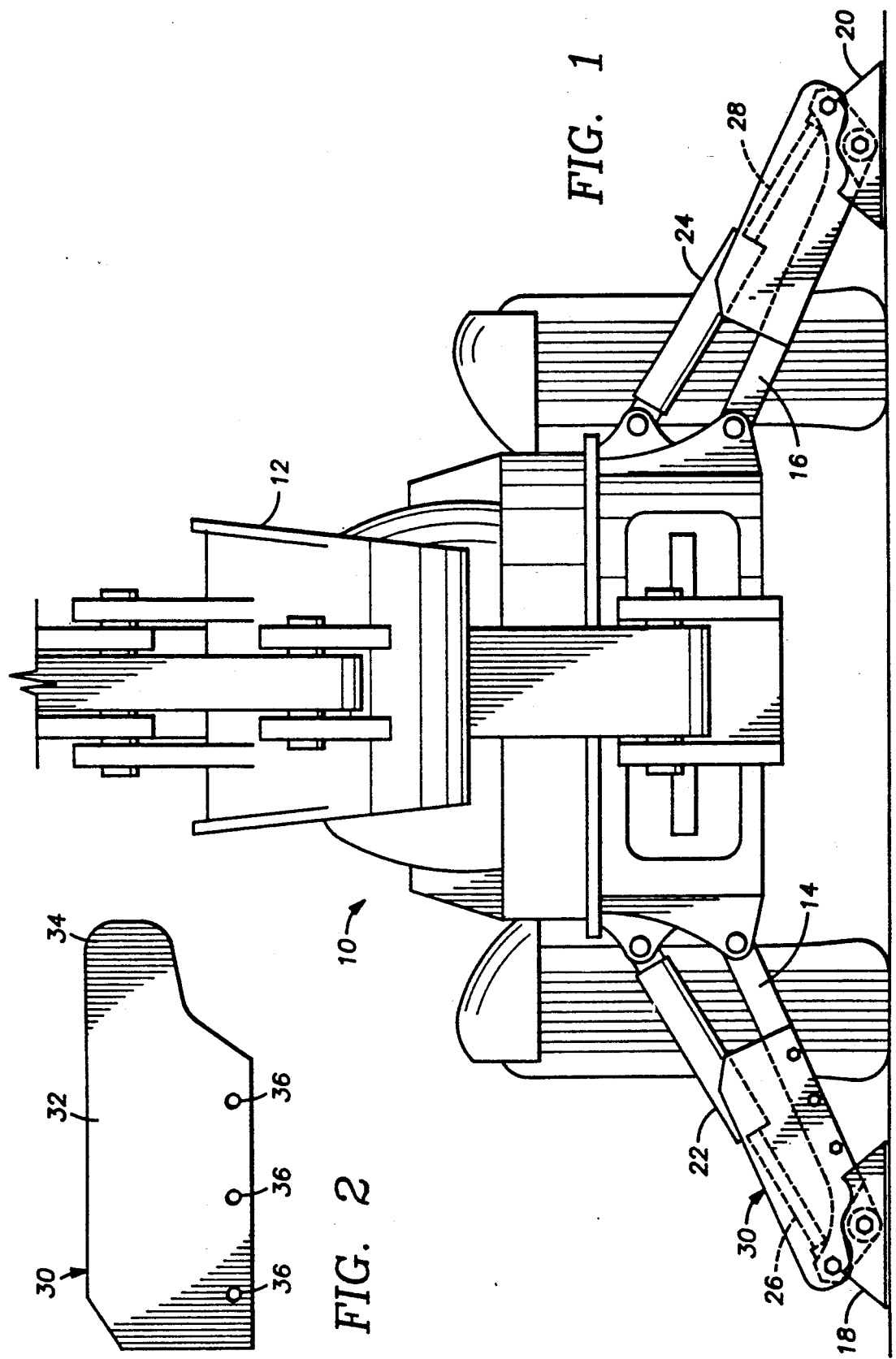

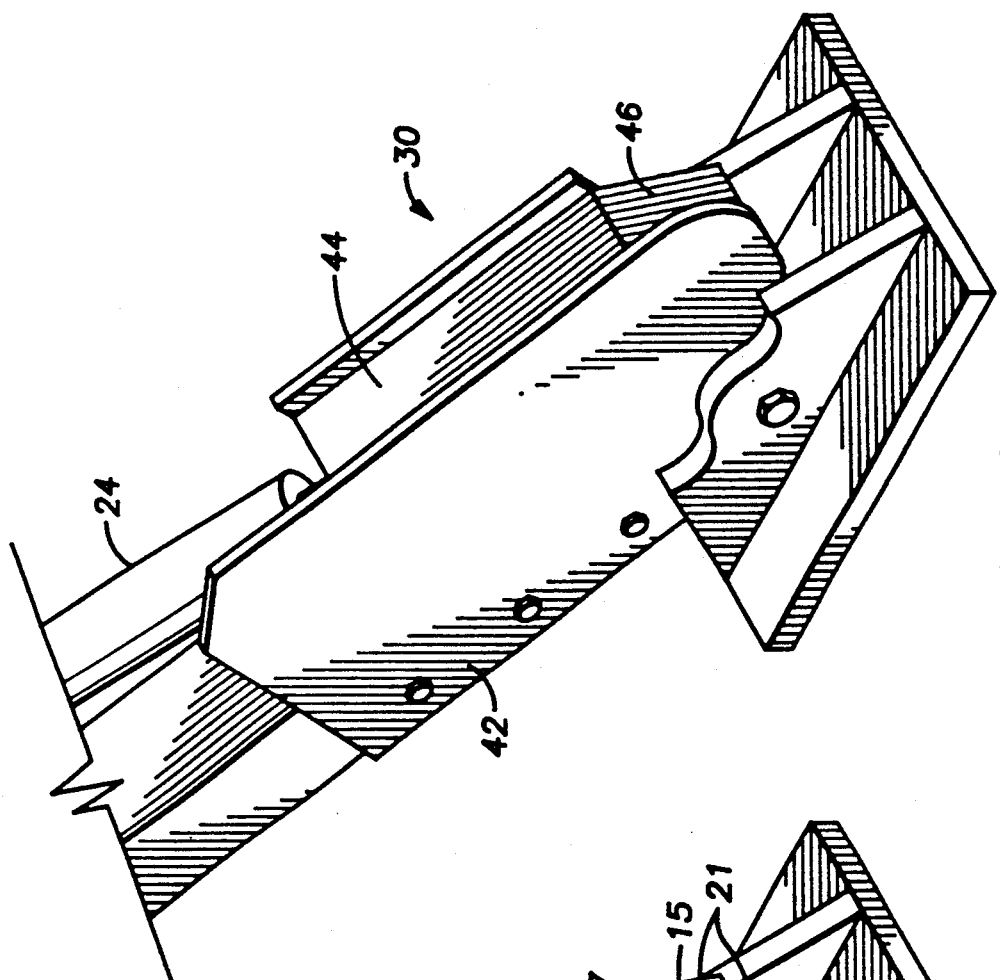
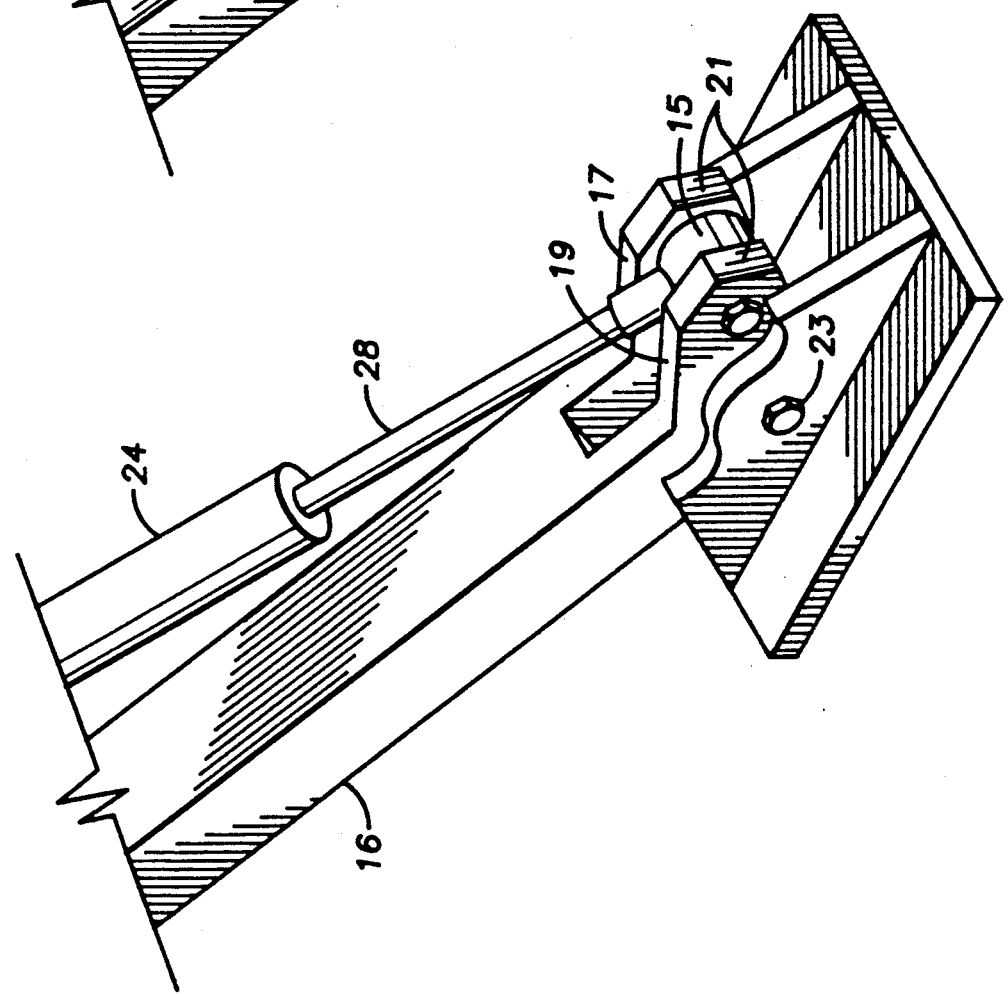

RAM GUARD

FIELD OF THE INVENTION

The present invention is directed to a guard for the rams which operate the stabilizer arms on a backhoe or other power equipment. More specifically, the guard of the present invention is a separate piece, not a part of the structure of the stabilizer arm, which is welded or bolted to the stabilizer arm at the extremity which has an exposed hydraulic piston rod.

BACKGROUND OF THE INVENTION

Equipment, either vehicles or backhoes, have been built where the hydraulic pistons and piston rods are not exposed. U.S. Pat. No. 3,638,965 discloses an outrigger mechanism for a truck or similar vehicle which includes a rear stabilizer assembly 15 and a forward stabilizer assembly 16. As shown in FIG. 3, the support leg 19 of rear stabilizer assembly 15 may be operated by a hydraulic ram 25 within the framework 18. U.S. Pat. No. 3,918,741 discloses an outrigger type stabilizing support assembly for a truck mounted loader, including a pair of selectively actuated, ground-engaging stabilizing members—a swing-out arm and a vertical support post—both powered by a common hydraulic ram. Both these patents illustrate a construction where the stabilizing structure or arm is hollow such that the hydraulic rams are enclosed within the structure. These patents fail to recognize the problem which the guard of the present invention solves.

The present invention is directed to a guard for equipment that has an exposed hydraulic piston rod which operates a stabilizer arm. The ram guard of the present invent protects the piston rod from being hit by dirt, rock or any materials which will collect on the rod or scar the rod and cause the piston to leak fluid. The only way to restore a scarred rod from leaking fluid is have the rod repolished which is very expensive.

SUMMARY OF THE INVENTION

The present invention is directed to a ram guard, which is attached to a stabilizer arm having an exposed hydraulic ram, having an outside surface which has a linear length greater than the length of the rod when fully extended. More specifically, the ram guard of the present invention comprises an outside surface attached to a stabilizer arm which has a linear length greater than the length of the piston rod of the ram, an upper surface to cover the exposed piston rod, and an end surface which attaches to the piece of the stabilizer arm to which the piston rod is attached.

BRIEF DESCRIPTION OF THE DRAWINGS

FIG. 1 shows a conventional backhoe with stabilizer arms having exposed hydraulic rams with the ram guards of the present invention;

FIG. 2 shows one embodiment of the ram guard of the present invention;

FIG. 3 shows the details of a stabilizer arm having an exposed hydraulic piston connecting the foot of the arm; and FIG. 4 shows another embodiment of a ram guard of the present invention.

BRIEF DESCRIPTION OF THE PREFERRED EMBODIMENTS

Many pieces of heavy equipment, used primarily for earth moving, have stabilizer arms to stabilize the piece of equipment when lifting loads on either side of the equipment and on uneven terrain. One such common piece of equipment is a backhoe. Referring now to FIG. 1, an earth mover or backhoe 10, having a shovel or bucket 12 on the back of earth mover 10 has two stabilizer arms 14 and 16. The stabilizer arms 14 and 16 each have feet, 18 and 20, respectively, which stabilizes the earth mover 10. Rams 22 and 24 raise and lower the stabilizer arms 14 and 16, respectively, and when the feet 18 and 20 of the stabilizer arms 14 and 16, respectively, are on the ground to provide stability to the earth mover 10. The feet 18 and 20 also provide stability to the earth mover or backhoe 10 when the bucket 12 has a load or is moving the load to one side or the other and are maintained in position by rams 22 and 24. The rams 22 and 24 comprise pistons with piston rods 26 and 28, respectively. When the rams 22 and 24 are extended the piston rods 26 and 28, respectively, are exposed and subject to being scared by dirt or rock being dug by the bucket 12.

The present invention is a ram guard 30 which is attached to each stabilizer arm 14 and 16 and extends along the outside surface adjacent the exposed piston rod 26 or 28, a linear length greater than the length of the piston rod 26 or 28. The ram guard 30 is 4" to 10" high or greater than the height of the exposed piston rod when the stabilizer arm is in the lowest position so that dirt which is moved or falls from the bucket 12 in front of the backhoe 10 is stopped before hitting the exposed rods 26 or 28. The outer face 32 of the ram guard 30 has one end 34 which is shaped to protect the end of stabilizer arms 14 and 16 as they fit into the feet 18 and 20, respectively, which swing on the ends of the stabilizer arms. Ram guard 30 has three openings 36 for bolts for attaching to the stabilizer arm 14 or 16. However, the ram guard 30 may be welded to the stabilizer arms 14 or 16 or held by any suitable device such as a clamp. It should be recognized that the ram guards 30 come in pairs which are mirror images of each other.

Referring now to FIG. 3, a more detailed view of one of the common construction of stabilizer arms 16 of a backhoe or earth mover is shown. This construction exposes the piston rod 28. Only one arm 16 is described again noting that the details of the other arm 14 is a mirror image of that shown and described. The stabilizer arm 16 has a rectangular cross-section which terminates in a split end with two outside pieces 17 an 19, each having a hexagonal shape. The piston rod 28 of ram 24, which raises and lowers stabilizer arm 16, is secured by a bolt which passes through the end 15 of piston rod 28 and the end pieces 17 and 19 of stabilizer arm 16. The foot 20 is attached to the stabilizer arm 16 by bolt 23.

Referring now to FIG. 4, a preferred embodiment of the ram guard 30 is shown. In this embodiment, the ram guard 30 has a plate 42 which is attached to each stabilizer arm 14 and 16 and extends along the outside surface adjacent the exposed piston rod 26 or 28 of the rams 22 and 24, respectively. In this embodiment, the ram guard 30 has a second plate 44 which provides an upper surface and extends over the piston rod 26 or 28 to cover the exposed piston rod. The ram guard 30 may also have a third plate or end surface 46 which attaches to the flat surface 21 of pieces 17 and 19 of the stabilizer arm 16 to which the piston rod is attached.

We claim:

1. A guard for an exposed piston rod which is attached to a stabilizer arm of an earth mover which comprises:
   a plate which is attached to said stabilizer arm and extending along and above the outside surface of said stabilizer arm adjacent to the exposed piston rod, said plate being a flat plate having a linear length greater than the length of the piston rod and less than the length of the piston plus the fully exposed piston rod;
   a second plate extending from said first plate which extends over the piston rod to cover the exposed piston rod; and
   a third plate which attaches to flat surfaces of the end pieces of the stabilizer arm to which the piston rod is attached.

2. A guard for an exposed piston rod which is attached to a stabilizer arm of an earth mover, said guard comprising:
   a first portion which is attached to said stabilizer arm and extending along and above the outside surface of said stabilizer arm adjacent to the exposed piston rod, said portion having a linear length greater than the length of the piston rod and less than the length of the piston plus the fully exposed piston rod;
   a second portion extending from said first portion which extends over the piston rod to cover the exposed piston rod; and
   a third portion which attaches to flat surfaces of the end pieces of the stabilizer arm to which the piston rod is attached.

* * * * *